United States Patent
Rowe et al.

(10) Patent No.: US 8,152,428 B2
(45) Date of Patent: Apr. 10, 2012

(54) FASTENER ASSEMBLY

(75) Inventors: James Henry Rowe, Gheshire (GB);
John Moore, Nottingham (GB)

(73) Assignee: Airbus Operations Limited, Bristol (GB)

( * ) Notice: Subject to any disclaimer, the term of this patent is extended or adjusted under 35 U.S.C. 154(b) by 759 days.

(21) Appl. No.: 12/095,357

(22) PCT Filed: Dec. 14, 2006

(86) PCT No.: PCT/GB2006/004690
§ 371 (c)(1),
(2), (4) Date: May 29, 2008

(87) PCT Pub. No.: WO2007/068937
PCT Pub. Date: Jun. 21, 2007

(65) Prior Publication Data
US 2008/0273938 A1    Nov. 6, 2008

(30) Foreign Application Priority Data
Dec. 16, 2005 (GB) .................................. 0525689.6

(51) Int. Cl.
*F16B 23/00* (2006.01)
*B23Q 1/00* (2006.01)
(52) U.S. Cl. ............. 411/397; 411/533; 29/271; 269/48
(58) Field of Classification Search .................. 411/388,
411/389, 395, 396, 533, 424, 337; 33/533,
33/645; 408/115 B; 29/271; 296/48; 269/48
See application file for complete search history.

(56) References Cited

U.S. PATENT DOCUMENTS

| | | | | |
|---|---|---|---|---|
| 1,487,610 A * | 3/1924 | Schatzel | ....................... | 411/533 |
| 3,041,913 A * | 7/1962 | Liska | ............................... | 411/87 |
| 3,158,045 A * | 11/1964 | Siler | ............................... | 408/1 R |
| 3,349,652 A * | 10/1967 | Cromwell | ........................ | 81/462 |
| 4,208,797 A * | 6/1980 | Stewart, Jr. | ..................... | 33/613 |
| 4,254,542 A * | 3/1981 | Craig | ............................... | 29/464 |
| 4,295,765 A * | 10/1981 | Burke | ........................... | 410/101 |
| 4,928,531 A * | 5/1990 | Schult et al. | ..................... | 73/855 |
| 5,123,812 A * | 6/1992 | Groenendaal et al. | ...... | 415/209.2 |
| 5,704,749 A | 1/1998 | Landgrebe | | |
| 6,280,202 B1 * | 8/2001 | Alden et al. | .................... | 439/66 |
| 6,318,924 B1 * | 11/2001 | Schiavo, Jr. | ................... | 403/299 |
| 6,974,290 B2 * | 12/2005 | Pountney | ...................... | 411/384 |

FOREIGN PATENT DOCUMENTS

| | | |
|---|---|---|
| FR | 2225995 | 11/1974 |
| GB | 501548 A | 3/1939 |
| JP | 2001055711 | 2/2001 |

OTHER PUBLICATIONS

ISR and Written Opinion for PCT/GB2006/004690 dated Apr. 4, 2007.
UK Search Report for GB0525689.6 dated Feb. 14, 2006.

* cited by examiner

*Primary Examiner* — Flemming Saether
(74) *Attorney, Agent, or Firm* — Lowe, Hauptman, Ham & Berner, LLP

(57) ABSTRACT

A fastener assembly includes a bolt having first and second ends and comprising a bolt head at the first end and a shank, at least a part of which is screw threaded, a nut for screw threaded engagement with the shank of the bolt, and a template alignment pin, wherein the bolt head is provided with a coupling formation for detachably coupling to a corresponding formation on the template alignment pin.

15 Claims, 3 Drawing Sheets

FASTENER ASSEMBLY

RELATED APPLICATIONS

The present application is based on International Application Number PCT/GB2006/004690 filed Dec. 14, 2006, and claims priority from, British Application Number 0525689.6 filed Dec. 16, 2005, the disclosures of which are hereby incorporated by reference herein in their entirety.

TECHNICAL FIELD

This invention relates to a fastener assembly and to a method of fastening together components, for example, aircraft components, using a fastener assembly.

BACKGROUND OF THE INVENTION

In the manufacture of wings for large aircraft, the wing components, including the wing skin panels, the spars, the ribs and other major components are typically partially assembled in a jig. Holes for fasteners are then drilled in predetermined locations. Slave bolts are then inserted in some of the holes and dowels inserted in others to hold the wing assembly together whilst further holes are drilled. Thereafter the bolts are unfastened and the components disassembled, for example, to allow deburring to be carried out, before they are finally reassembled.

In order to drill the further holes in the correct positions, it is common to use either a manual template arrangement or to use an automatic drilling machine. When a manual template is used, a template is placed over one or more of the slave bolts and is held in the correct, fixed position by the engagement with the slave bolts. When an automatic drilling machine is used, however, the heads of the slave bolts provide visual reference points for the machine which after drilling a hole is moved over the components to another position for drilling another hole.

When a template is used as described above, it is desirable that a head of the slave bolt projects a substantial distance outwards from the components to provide a good physical location for the template. On the other hand, when an automatic drilling machine is employed, it is desirable that the bolt projects only a very limited distance so that the drilling machine can travel over the bolt in close proximity to the components. In order to meet those two conflicting requirements it has in the past been necessary to provide two different slave bolts.

It is an object of the invention to provide a fastener assembly that is adaptable for use with both a template and an automatic drilling machine.

SUMMARY OF THE INVENTION

According to the invention there is provided a fastener assembly including:
a bolt having first and second ends and comprising a bolt head at the first end and a shank, at least a part of which is screw threaded,
a nut for screw threaded engagement with the shank of the bolt, and
a template alignment pin,
wherein the bolt head is provided with a coupling formation for detachably coupling to a corresponding formation on the template alignment pin.

By providing such a fastener assembly, a template alignment pin can be coupled to the bolt head when the bolt head is to be used with a manual template and the bolt head can be sized such that, without the alignment pin coupled, it is suitable for use with an automatic drilling machine.

Preferably the coupling formation on the bolt head is at least partially screw threaded for screw threaded engagement with a corresponding screw threaded formation on the template alignment pin. A screw threaded coupling represents a simple and effective way of providing the detachable coupling.

The coupling formation on the bolt head is preferably a female formation and, more particularly, preferably comprises a recess in the bolt head. The recess preferably includes a first outer part of a first cross-section and a second inner part of a second smaller cross-section. Preferably the cross-sections are circular. In the case where the coupling formation on the bolt head is at least partially screw threaded, the second inner part of the recess is preferably screw threaded. In such a case the template alignment pin preferably has a male screw threaded part for screwing into the second inner part of the recess and a cylindrical part of circular cross-section having a smooth periphery that is a close fit in the first outer part of the recess.

Preferably the template alignment pin includes a generally cylindrical body that is of circular cross-section and has first and second ends, the coupling formation being provided at the first end. The periphery of the cylindrical body can provide a very appropriate location surface for a template.

The template alignment pin may be provided with a bore, preferably passing right through the pin, transverse to the axis of the cylindrical body and in the region of the second end of the body.

The fastener assembly preferably further includes a washer around the shank of the bolt and extending over a rear face of the bolt head. The washer may be made of a plastics material, which may be a polyamide, for example nylon.

Preferably the washer is formed with a rear face part extending over the rear face of the bolt head, an outer circumferential part extending forwardly of the rear face part and a retaining part that extends inwardly from the outer circumferential part and engages the bolt head to retain the washer on the bolt head. The washer may be resiliently deformed as it is fitted over the rear face of the bolt head. The bolt head may be formed with a circumferential groove for receiving the retaining part of the washer.

Whilst the invention may be employed with a wide variety of forms of bolt shank and nut arrangements, it is particularly preferred that it is used with a particular form of bolt shank and nut. Thus it is preferred that the shank comprises a first shank portion having a smooth circumferential surface of a first diameter and a second shank portion coaxial with the first shank portion and of a second diameter smaller than the first diameter, at least a part of the second shank portion being externally screw threaded, the first shank portion being positioned between the bolt head and the second shank portion; also it is preferred that the nut includes a first bore extending from the first end of the nut and of a diameter greater than the first diameter for fitting over part of the first shank portion of the bolt, and, in the region of the second end, a screw threaded bore for screw threaded engagement with the screw threaded second shank portion, the screw threaded bore being coaxial with and leading into the first bore. By providing a bolt with a first shank portion having a smooth circumferential surface and a second shank portion that is threaded and of smaller diameter it becomes possible to provide in a single fastener assembly both the function of clamping and the function of aligning. That makes the whole fastening procedure simpler and reduces the number of different kinds of part that have to be handled compared to prior art arrangements where the screw threaded slave bolts are used to provide the clamping formation and dowels are used to provide the alignment function.

Preferably the bolt head is at one end of the first shank portion. Preferably the second shank portion extends from the end of the first shank portion to the second end of the bolt. Thus the bolt preferably consists of three parts: the bolt head, the first shank portion and the second shank portion. The bolt head and the second shank portion are used in providing the clamping function of the assembly whilst the first shank portion is used in providing the aligning function.

The bolt head may be of non-circular exterior cross-section, for example, it may have a hexagonal exterior cross-section. The first and/or second end of the bolt may be formed with a blind bore of non-circular, for example, hexagonal, cross-section, the bore being coaxial with the first and second shank portions of the bolt. Such formations facilitate the relative rotation of the nut and the bolt that is required during fastening or unfastening.

The second end of the nut may be closed over but it is preferred that the screw threaded bore in the nut extends through the second end of the nut. It is then possible to screw the nut fully onto the second shank portion of the bolt allowing a greater range in the thickness of articles on which the fastener assembly can be employed.

The first bore in the nut is preferably a plain bore and may be of greater axial length than the screw threaded bore in the nut. The length of the screw threaded bore need only be sufficient to enable the thread to transmit sufficient clamping force, whereas the length of the first bore can determine the range of thickness of articles on which the fastener assembly can be employed and is therefore preferably longer.

The assembly may further include a washer at the first end of the nut around the first bore. The washer may be formed as an integral part of the nut but is preferably formed separately from the nut and fastened to the nut. The washer may be made of a plastics material, which may be a polyamide, for example nylon.

Preferably the washer is formed with a front face part extending over the end face of the first end of the nut, an outer circumferential part extending rearwardly of the front face part and a retaining part that extends inwardly from the outer circumferential part and engages the nut to retain the washer on the nut. The washer may be resiliently deformed as it is fitted over the end face of the first end of the nut. The first end of the nut may be formed with a flange and the washer may be fitted over the flange.

The diameter of the first shank portion is preferably made to a tolerance of less than 0.05 mm and preferably to a tolerance of less than 0.02 mm. Thus, when in accordance with this preferred aspect of the invention, a multiplicity of similar fastener assemblies are provided, the actual diameters of the first shank portions vary by less than 0.10 mm and preferably by less than 0.04 mm.

The bolt, the template alignment pin and the nut may be made of metal, for example, steel.

The bolt of the fastener assembly is itself of novel design and may be provided separately from the other parts of the fastener assembly. Accordingly, the invention further provides a bolt suitable for use in a fastener assembly as defined above.

The invention further provides a bolt having first and second ends and comprising a bolt head at the first end and a shank, at least a part of which is screw threaded, wherein the bolt head is adapted to detachably receive a template alignment pin.

The present invention further provides a method of fastening articles together, the method comprising the following steps:

holding the articles together with holes in the articles aligned, providing a fastener assembly as defined above, fastening the bolt and nut of the fastener assembly with the bolt passing through the aligned holes, and coupling the template alignment pin to the bolt head.

As already explained the bolt may be adapted for use with either a manual template or an automatic drilling machine. Thus the method may further comprise the step of drilling further holes through the articles with the use of a manual template fitted over the template alignment pin. Also the method may further comprise the step of drilling further holes through the articles with an automatic drilling machine while the template alignment pin is removed, the automatic drilling machine being arranged to detect the location of the bolt head.

The method may further comprise the following features:

providing the bolt with a first shank portion having a smooth circumferential surface of a first diameter and a second shank portion coaxial with the first shank portion and of a second diameter smaller than the first diameter, at least a part of the second shank portion being externally screw threaded, the first shank portion being positioned between the bolt head and the second shank portion, inserting the second end of the bolt into and through the aligned holes, the first shank portion of the bolt being a close fit in the holes, the nut having first and second ends and including a first bore extending from the first end of the nut and of a diameter greater than the first diameter of the first shank portion, and, in the region of the second end, a screw threaded bore coaxial with and leading into the first bore, and screwing the nut onto the bolt with the first bore of the nut fitting over part of the first shank portion of the bolt and the screw threaded bore of the nut in screw threaded engagement with the screw threaded shank portion.

The method may further include the step of forming the aligned holes by drilling.

The method is of particular relevance in the temporary assembly of articles, for example, while drilling is carried out. Thus the method may further include the subsequent steps of:

unscrewing the nut from the bolt, removing the bolt from the aligned holes, separating the articles, and subsequently refastening the articles with the holes aligned.

The invention is of particular relevance to the aircraft industry and the articles to be fastened together may be aircraft components, for example, one article may be a wing panel and another article may be a rib.

The use of a bolt having first and second shank portions is of particular advantage where the articles are of composite material, or at least one of the articles is of composite material. Such material is especially vulnerable to damage.

DESCRIPTION OF THE DRAWINGS

By way of example, an embodiment of the invention will now be described with reference to the accompanying drawings, of which.

DETAILED DESCRIPTION

Figure 1:
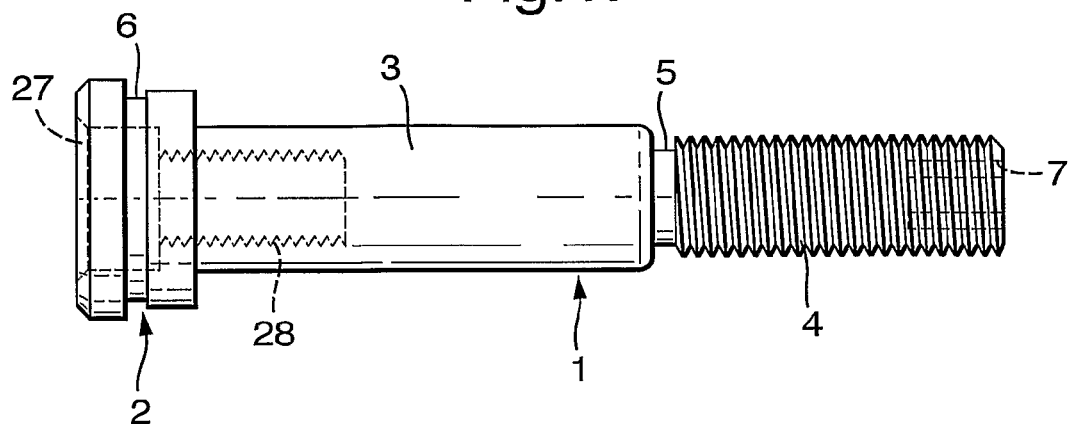
FIG. 1 is a side view of a bolt of a fastener assembly.

Referring first to FIG. 1, there is shown a bolt 1 consisting of a bolt head 2, a first shank portion 3 and a second shank portion 4. The shank portions 3 and 4 are of circular cross-section and coaxial. The first shank portion 3 has a smooth circumferential surface and is of larger diameter than the second shank portion 4, which is screw threaded. An undercut 5 is provided at the junction of the shank portions 3 and 4 and a groove 6 is provided on the periphery of the head 2.

A blind bore 7 is provided in the second shank portion 4. The blind bore 7 is of hexagonal cross-section and coaxial with the shank portions 3,4. The bore 7 provides a recess which can be engaged by a suitable tool to rotate the bolt.

Figure 1A:
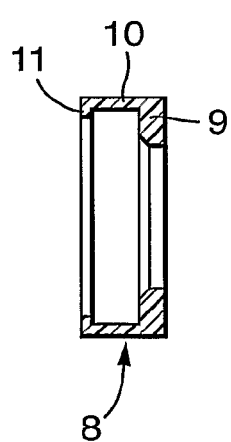
FIG. 1A is a sectional side view of a washer for fitting to the bolt of FIG. 1.

FIG. 1A shows a washer 8 which is made of nylon. The washer 8 consists of a rear face part 9 of annular shape, an outer circumferential part 10 extending forwardly from the periphery of the rear face part 9 and a retaining part 11 in the form of a lip that extends inwardly from the front end of the circumferential part 10. When the washer 8 is fitted to the bolt 1, the rear face part 9 covers over the rear face of the bolt head 2, and the retaining part 11 engages in the groove 6 in the periphery of the bolt head. As will be understood, the washer 8 is resiliently deformed to enable the retaining part 11 to pass over part of the bolt head 2 and into the groove 6.

Figure 2:
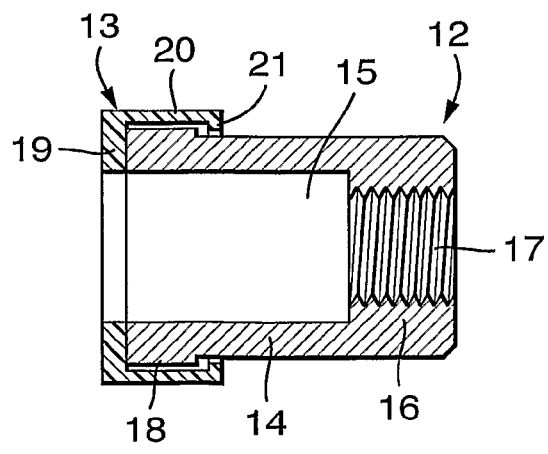
FIG. 2 is a sectional side view of a nut and washer of the fastener assembly.

Referring now to FIG. 2, there is shown a nut 12 and a washer 13. The nut 12 consists of a forward portion 14 formed with a plain bore 15 of circular cross-section and a rearward portion 16 formed with a screw threaded bore 17 of circular cross-section. The bores 15 and 17 are coaxial and the bore 15 is substantially larger than the bore 17. At the front end of the nut, the forward portion 14 has an integral flange 18.

The washer 13 consists of a front face part 19 of annular shape, an outer circumferential part 20 extending rearwardly from the periphery of the front face part 19 and a retaining part 21 in the form of a lip that extends inwardly from the rear end of the circumferential part 20. The washer is made of nylon and can be resiliently deformed so as to be fitted over the flange 18 of the nut, as shown in FIG. 2. Once so fitted, the front face part 19 extends over part of the front face of the nut to provide the washer function.

Figure 3:
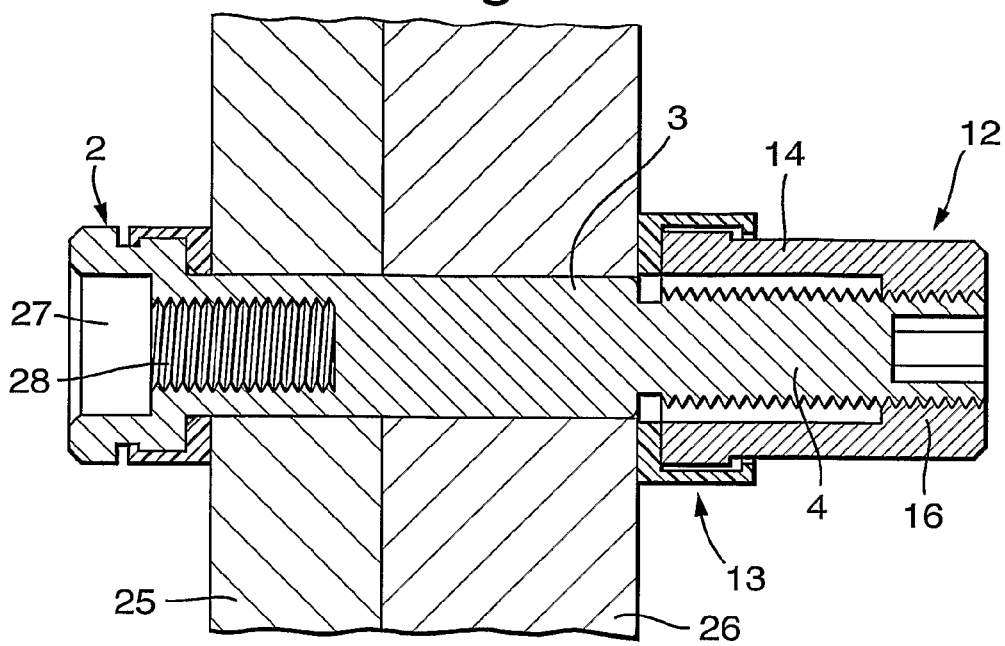
FIG. 3 is a sectional side view of the fastener assembly securing together two components.

FIG. 3 shows the fastener assembly of FIGS. 1, 1A and 2 in use to secure together two components, referenced 25 and 26 in FIG. 3. The components may for example comprise a wing panel and a rib of an aircraft wing. With the components 25 and 26 held in a desired relationship and aligned holes drilled in the components, the bolt 1 is inserted into the holes to the position shown in FIG. 3. The first shank portion 3 is an exact fit in the hole and, as shown in FIG. 3, is of sufficient length to extend through the combined thickness of the components 25,26 to the other side, with the second shank portion 4 projecting further on that other side. (It will be understood that FIG. 3 shows the fastener assembly used on components of maximum desired thickness; the assembly can also be used on thinner components, in which case the first shank portion 3 projects out beyond the component 26.) The nut 12 is then screwed onto the bolt 1 with the forward portion 14 first being placed over the projecting end of the bolt 1 and the rearward portion 16 then being screwed onto the second shank portion 4 of the bolt. The plain bore 15 of the forward portion 14 of the nut is of a diameter slightly greater (for example 0.5 mm greater) than the diameter of the first shank portion 3 of the bolt and the forward portion 14 is therefore able to pass over the bolt 1 until the front face part 19 of the washer 13 abuts against the component 26.

Once the nut 12 is tightened, the fastener assembly is effective both to keep the components 25,26 clamped together and to keep them in alignment by virtue of the exact fit of the first shank portion 3 in the components. At the same time, because the first shank portion 3 is formed with a smooth circumferential surface, there is little risk of damage to the holes in the components 25,26.

Referring to FIGS. 1 and 3, the bolt head 2 is formed with a recess consisting of a first outer part 27 of circular cross-section and a second inner part 28 also of circular cross-section. The inner part 28 is screw threaded and of smaller diameter than the outer part 27.

Figure 4A:
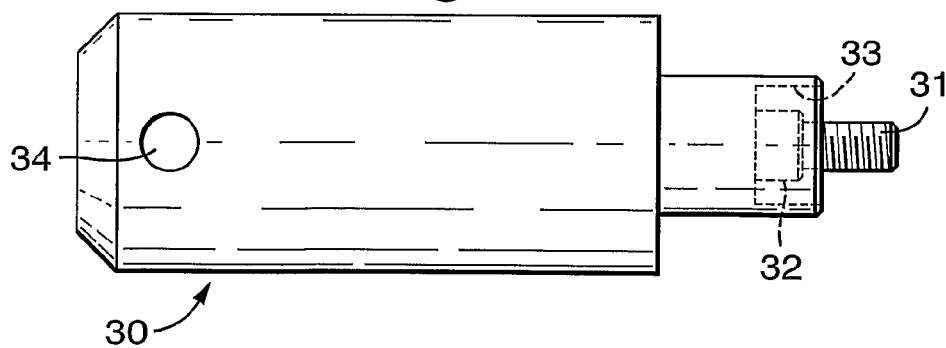
FIG. 4A is a side view of a first form of template alignment pin.

Referring now also to FIG. 4A, there is shown a template alignment pin 30 having a generally cylindrical body of circular cross-section. At a first end of the pin 30, a coupling formation for detachably coupling the pin to the bolt head 2 is provided. The coupling formation includes a screw threaded male part 31 which can be screwed into the inner part 28 of the recess in the bolt head 2. The part 31 projects from a projecting part 32 which is a close fit in the outer part 27 of the recess in the bolt head 2. Around the projecting part 32, an annular recess 33 is defined and that is sized to receive the peripheral portion of the bolt head 2.

The other end of the template alignment pin 30 is provided with a transverse through bore 34 along a diameter of the pin. That bore 34 can receive a tool to allow the pin 30 to be screwed into, or out of, the bolt head 2.

Figure 4B:
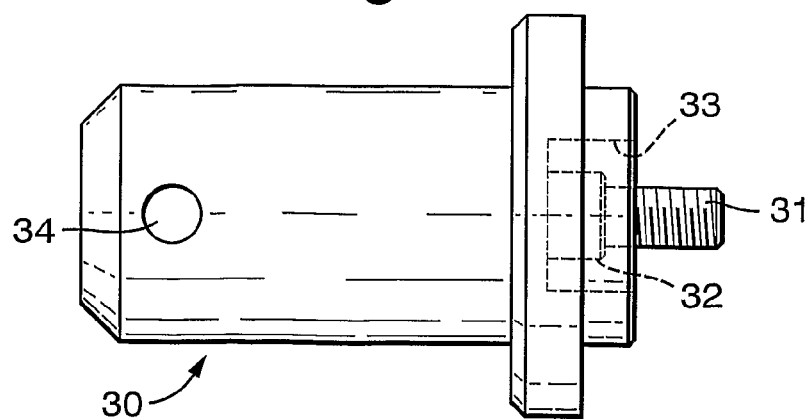
FIG. 4B is a side view of a second form of template alignment pin.
Figure 5:
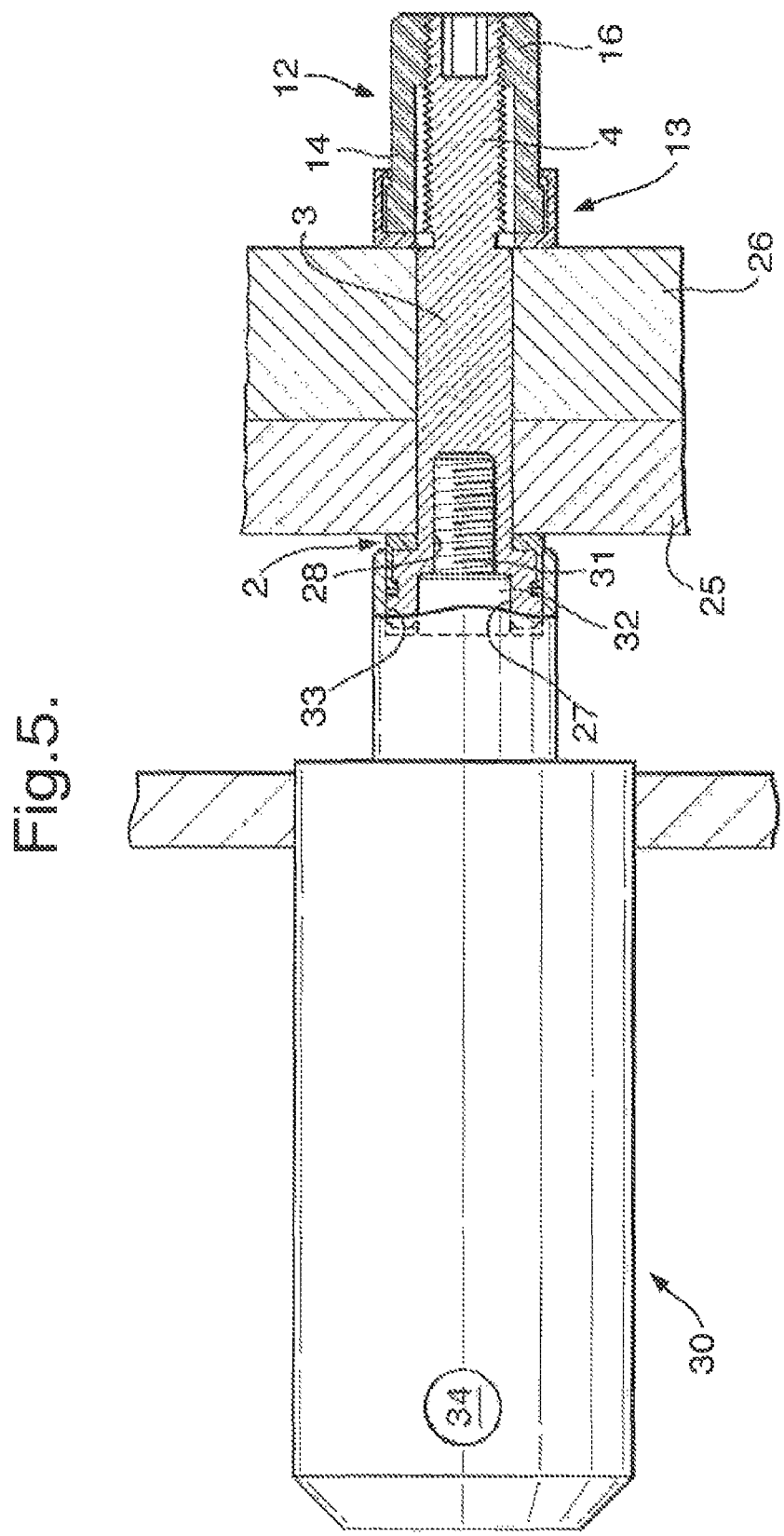
FIG. 5 is a side view of the template alignment pin assembled and threaded onto the bolt head.

FIG. 4B shows another template alignment pin of similar construction but different dimensions from the pin shown in FIG. 4A. The same reference numerals are used in both Figures to designate corresponding parts.

With the components 25,26 clamped together by the fastener assembly, and in a typical case, also by other fastener assemblies, many other holes may be drilled in the components 25,26. Those other holes may be drilled using an automatic drilling machine or manually with the aid of a template. If an automatic drilling machine is used, then the alignment pin 30 is not used or, if it has previously been screwed to the bolt head 2, is unscrewed from the bolt head. The automatic drilling machine includes a visual sensor, for example, a camera, to detect the position of the bolt head 2, which it does by detecting the geometrical shape of the bolt head. As shown in the drawings that head has an external chamfer and an outer recess 27. The ring shape so formed can be detected by the camera and the position of the axis of the fastener assembly thereby ascertained. If a manual template is used, then the alignment pin 30 is screwed to the bolt head 2 and a hole in the template is fitted over the alignment pin, which is a close fit in the hole so as to locate the template in the desired position.

Once the holes have been drilled, the fastener assembly (and any other assemblies) can then be unfastened, the bolt removed and the components 25,26 deburred before being finally assembled again. The fastening and unfastening of the or each fastener assembly may be carried out manually or automatically.

By providing relatively long first and second shank portions 4,5 for the bolt 1 and by providing a relatively long bore 15 in the nut, the same bolt 1 can be used to clamp a range of thicknesses of components. Consequently a single fastener assembly is suitable for use in all holes of a given diameter. Of course different fastener assemblies are required for different diameters of hole. Conveniently, the bolt heads 2 are provided in only a limited number of different sizes, with the same size of bolt head being used with more than one diameter of hole. These features facilitate the handling of the bolts by automated delivery equipment.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A fastener assembly including:
   a bolt having first and second ends and comprising a bolt head at the first end and a shank, the shank comprising a first shank portion having a smooth circumferential surface of a first diameter and a second shank portion coaxial with the first shank portion and of a second diameter smaller than the first diameter, at least a part of the second shank portion being externally screw threaded, the first shank portion being positioned between the bolt head and the second shank portion,
   a nut for screw threaded engagement with the second shank portion of the bolt, and
   a template alignment pin, comprising a generally cylindrical body having a smooth outer surface and a circular cross-section, a periphery of the cylindrical body being arranged to provide a locating surface for a template, and the template alignment pin having first and second ends,
   wherein the bolt head is provided with a coupling formation for detachably coupling to a corresponding formation on the first end of the template alignment pin.

2. A fastener assembly according to claim 1, in which the coupling formation on the bolt head is at least partially screw threaded for screw threaded engagement with the corresponding formation on the template alignment pin.

3. A fastener assembly according to claim 1, in which the coupling formation on the bolt head comprises a recess.

4. A fastener assembly according to claim 3, in which the recess includes a first outer part of a first cross-section and a second inner part of a second smaller cross-section.

5. A fastener assembly according to claim 4, in which the cross-sections are circular.

6. A fastener assembly according to claim 5, in which the second inner part of the recess is at least partially screw threaded.

7. A fastener assembly according to claim 1, further including a washer around the shank of the bolt and extending over a rear face of the bolt head.

8. A fastener assembly according to claim 7, in which the washer is formed with a rear face part extending over the rear face of the bolt head, an outer circumferential part extending forwardly of the rear face part and a retaining part that extends inwardly from the outer circumferential part and engages the bolt head to retain the washer on the bolt head.

9. A fastener assembly according to claim 1, in which the nut includes a first bore extending from the first end of the nut and of a diameter greater than the first diameter for fitting over part of the first shank portion of the bolt, and, in the region of the second end, a screw threaded bore for screw threaded engagement with the screw threaded second shank portion, the screw threaded bore being coaxial with and leading into the first bore.

10. A method of fastening articles together, the method comprising the following steps:
    holding the articles together with holes in the articles aligned,
    providing a fastener assembly including a bolt having first and second ends and comprising a bolt head at the first end and a shank, the shank comprising a first shank portion having a smooth circumferential surface of a first diameter and a second shank portion coaxial with the first shank portion and of a second diameter smaller than the first diameter, at least a part of the second shank portion being externally screw threaded, the first shank portion being positioned between the bolt head and the second shank portion,
    providing a nut for screw threaded engagement with the second shank portion of the bolt,
    providing a template alignment pin having a generally cylindrical body having a smooth outer surface and a circular cross-section, a periphery of the cylindrical body being arranged to provide a locating surface for a template, and the template alignment pin having first and second ends,
    providing the bolt head with a coupling formation for detachably coupling to a corresponding formation on the first end of the template alignment pin,
    fastening the bolt and nut of the fastener assembly with the bolt passing through the aligned holes,
    coupling the template alignment pin to the bolt head, and using the template alignment pin to align a template.

11. A method according to claim 10, including the further subsequent steps of:
    unscrewing the nut from the bolt,
    removing the bolt from the aligned holes,
    separating the articles, and subsequently
    refastening the articles with the holes aligned.

12. A method according to claim 10, in which the articles to be fastened together are aircraft components.

13. A method according to claim 10, in which at least one of the articles to be fastened together is of composite material.

14. A fastener assembly including:
    a bolt having first and second ends and comprising a bolt head at the first end and a shank, at least part of which is screw threaded,
    a nut for a screw threaded engagement with the shank of the bolt, and
    a template alignment pin having a periphery arranged to provide a locating surface for a template,
    wherein the bolt head is provided with a coupling formation for detachably coupling to a corresponding formation on the template alignment pin, the coupling formation on the bolt head comprising a recess having a first outer part of a first circular cross-section and a second inner part being at least partially screw threaded and being of a second smaller and circular cross-section, and
    wherein the coupling formation on the template alignment pin comprises a smooth shank portion and a screw-threaded shank portion extending coaxially therefrom, the smooth shank portion having a diameter greater than the diameter of the screw-threaded shank portion, and wherein the diameter of the smooth shank portion is substantially the same as the diameter of the first outer part of the coupling formation so that the smooth shank portion forms a close fit with the first outer part of the coupling formation on the bolt head, and the screw-threaded shank portion is arranged to co-operate with the second inner part of the coupling formation of the bolt head.

15. A fastener assembly according to claim 14, wherein the template alignment pin comprises a generally circular cylindrical body that is a circular cross-section and of greater diameter than the diameter of the shank of the bolt.

* * * * *